May 16, 1967  C. N. WILCH  3,319,436
ICE SLUSH DISPENSER
Original Filed Oct. 5, 1964  2 Sheets-Sheet 1

INVENTOR.
Clarence N. Wilch
BY
ATTORNEYS.

May 16, 1967  C. N. WILCH  3,319,436
ICE SLUSH DISPENSER

Original Filed Oct. 5, 1964  2 Sheets-Sheet 2

INVENTOR.
Clarence N. Wilch
BY
Scofield, Kokjer, Scofield & Lowe
ATTORNEYS.

United States Patent Office 3,319,436
Patented May 16, 1967

3,319,436
ICE SLUSH DISPENSER
Clarence N. Wilch, Topeka, Kans., assignor to Phillips Petroleum Company, a corporation of Delaware
Continuation of abandoned application Ser. No. 401,496, Oct. 5, 1964. This application Nov. 29, 1965, Ser. No. 530,240
20 Claims. (Cl. 62—68)

This application is a continuation application of my copending application Ser. No. 401,496, filed Oct. 5, 1964, now abandoned which in turn is a continuation-in-part of my application Ser. No. 204,877, filed June 25, 1962, now abandoned.

This invention relates to a method and means for producing a slush of a liquid containing frozen particles therein. This invention also relates to improvements in methods of and apparatus for producing ice slush beverages from flavored water and refers more particularly to improvements in such apparatus and methods wherein a flavored water mixture is continuously prepared and maintained in an ice slush state for continuous or intermittent dispensing of same.

It is known in the art to provide methods of and apparatus for making ice slush beverages wherein the frozen flakes or particles of the beverage are scraped from a refrigerated surface inside the storage tank for the beverage. Such conventional methods and apparatus, however, have not satisfactorily solved the many problems of preparing, storing and dispensing this type of beverage on a continuous or intermittent basis.

My application Ser. No. 204,877, supra, disclosed methods of and apparatus for producing a beverage comprised primarily of a mixture of water and flavoring ingredients together with a given or desired percentage of solid particles. In this apparatus, chilling of the liquid for production of frozen particles for the beverage was accomplished in a portion of the apparatus separate from and isolated from the main storage tank for the beverage. Also in this device, the dispensing outlet was positioned immediately at the discharge end of a screw pump and the freezing chamber whereby to provide a high percentage of frozen particles in the beverage as dispensed to the consumer. The dispensing spigot was so positioned as to be able to drain all liquid from the system if so desired without tilting or manipulation of the apparatus. Stirring means were provided in the device which prevented the beverage mixture from becoming lumpy. A screw pump was employed to pump the product through the freezing chamber and also pump the mixture as dispensed from the dispensing spigot. In operation of the device, flavored water mixture was continuously supplied from a supply tank through flow channels to an agitating tank. A screw pump in a freezing chamber below the agitating tank drew liquid from the agitating chamber downwardly through a flow channel and then recirculated same through another flow channel to the agitating tank.

An object of the instant invention is to provide methods of and apparatus for producing an ice slush drink from flavored water which accomplishes all of the objects of my application Ser. No. 204,877, supra, and additionally, accomplishes other and further major objects and advantages.

Another object of the invention is to provide methods of and apparatus for producing a beverage composed primarily of a mixture of water and flavoring ingredient together with a given or desired percentage of solid particles, said beverage having viscosity characteristics as to be not readily flowable, thereby requiring a positive displacement screw pump for circulating the product within the producing apparatus and dispensing the product.

Another object of the invention is to provide an ice slush making device and methods of operating same wherein precise control of the slush consistency of the entire stock or inventory of beverage or process system is both possible and achieved.

Another object of the invention is to provide an apparatus adapted to produce, for either continuous or intermittent dispensation, an ice slush beverage of the character described, said apparatus compact, relatively cheap and easy to manufacture, extremely reliable in operation and having a long service life in continuous use.

Another object of the invention is to provide an ice slush producing device for making beverages of the type described wherein the frozen beverage is continuously circulated through the chilling chamber by means of a positive displacement screw pump and wherein both the dispensing outlet for the device and the recycle flow line to the agitating chamber are positioned immediately at the discharge end of the screw pump and freezing chamber whereby to both have a high percentage of frozen particles in the beverage as dispensed to the consumer and maintain the inventory of frozen beverage in the device in a state of optimum character for consumption and dispensation.

Another object of the invention is to provide an apparatus for producing an ice beverage of the character described of considerably different tank construction than my related device shown in my application Ser. No. 204,877, supra, yet wherein necessary scrubbing and washing thereof and cleaning same is kept to a minimum, the machine so designed as to be readily disassembled whenever necessary for cleaning or washing, the instant machine representing an improvement with respect to these characteristics over my previous disclosed device.

Another object of the invention is to provide an ice slush beverage maker of the character described which operates in a different manner from the device described in my previous application Ser. No. 204,877, supra, to bring the product to the desired state and then continuously maintain the same in a stabilized form whereby to always provide a desirable drink, said different mode and manner of operation representing an improvement over my previously disclosed device.

Another object of the invention is to provide an ice slush producing device of a construction and operation different from my related device disclosed in my application Ser. No. 204,877, supra, the instant device also requiring very little maintenance, having all moving parts standard and readily serviced and repaired by qualified servicemen.

Another object of the invention is to provide methods of and apparatus for producing a variety of types of ice slush beverages having freezing points which may vary considerably from one type to another, means provided for determining and adjusting the consistency of the product to enable such beverage variety production, said means differing from that shown in my application Ser. No. 204,877, supra, and constituting an improvement thereover.

Another object of the invention is to provide apparatus for producing ice slush beverages wherein the beverage mixture is continuously circulated to a freezing chamber from an agitating chamber and in return thereto by means of a positive displacement screw pump, means provided reacting to the viscosity of the liquid in the agitating tank to control flow of heat exchanging medium to the freezing chamber whereby to maintain the inventory of liquid beverage in the apparatus at a desired consistency, temperature and viscosity while yet permitting continuous circulation and agitation thereof within said apparatus.

Another object of the invention is to provide apparatus for producing ice slush beverages wherein novel and inventive means and structures are provided whereby a single tank enclosure is sub-divided into a supply and agitating section by removable insert structure whereby to provide a desirable subdivision of the said tank enclosure and limit the agitating section of the device yet not require complicated, expensive, objectionable, permanent separate tankage structures in the apparatus.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Figure 1:
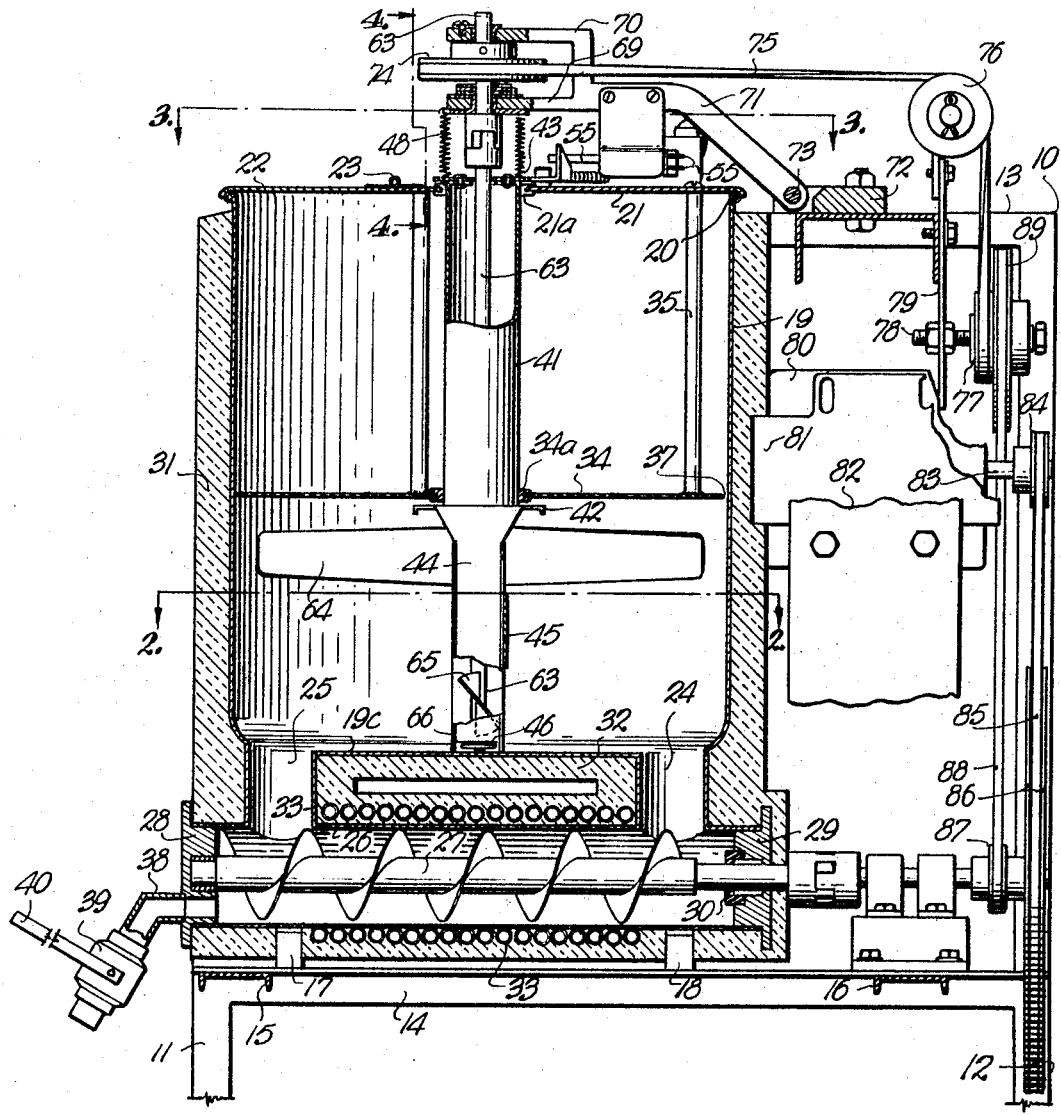
FIGURE 1 is a transverse sectional view of the subject ice slush producing device, the view sectional approximately midway through the device in the left-hand portion of the view, while merely a side view of the interior of the cabinet in the right-hand portion of the view showing the power drive means.

Referring to the drawings, a housing or support structure generally designated 10 has side walls (not seen), end walls 11 and 12 and top wall 13. Floor 14 is mounted slightly above the lower edges of the side and end walls and carries beams 15 and 16 which in turn mount angles 17 and 18.

Cylindrical tank 19 has turned out flange 20 at the top thereof, the latter bearing on top wall 13 to aid in support thereof. Tank 19 is closed at the top by cover plate 21 which has a flap closure 22 at one side thereof for ready filling of tank 19 with hinge 23. A lower outlet opening or passage 24 is provided at one side of the lower end of tank 19 while, diametrically opposite thereto, there is recycle opening or passage 25. Outlet passage 24 leads to and recycle passage 25 leads from a preferably cylindrical chilling chamber generally designated 26. Screw pump 27 of positive displacement type is mounted for rotation in chamber 26 on a shaft 30 carried by bearings 28 and 29. Suitable conventional insulation 31 sheeting such as glass fiber mat or closed cellular material or the like surrounds and encircles tank 19 and the outlet and recycle passages 24 and 25. Further suitable additional conventional type insulation overlies, underlies and surrounds as at 32 chilling chamber 26, insulation 32 also receiving therewithin cooling coils 33 or other heat exchanging device. Coils 33 permit circulation of suitable heat exchanging medium of conventional type. Upper and lower insulation 31 and 32 and cooling coils 33 are further suitably enclosed in sheet metal 19a (not all seen) which latter also forms the bottom of tank 19 and the walls of passages 24 and 25. Coils 33 communicate with a conventional compressor (not shown) which is operated in conventional fashion to effect cooling of the heat exchanging medium in coils 33. A pump (not shown) of conventional construction may be employed if desired in the coil/compressor flow circuit to aid in circulation. The compressor (and pump, if present) are operated in simple ON–OFF fashion by microswitch 53 as will be described.

Tank 19 is normally subdivided in substantially two equal portions by a plate or divider 34 rigidly yet removably suspended from cover plate 21 by rods 35. The assembly of cover plate 21, divider plate 34 and rods 35 may become removably integral with that of tank 19 by virtue of wing nut fasteners 36 (FIGURE 3) attached to studs secured at their lower ends in turned out flange 20 of tank 19. Sufficient peripheral clearance between the inside surface of tank 19 and the periphery of divider plate 34 is provided for replenishing liquid to pass downwardly between the upper and lower tank zones or portions as seen at 37. Dispensing conduit 38 preferably discharges from the lower and screw pump output end of the chilling chamber (here through end plate 28) and has on the outer end thereof dispenser nozzle 39 of conventional type with operating handle 40.

Divider plate 34 has central circular opening 34a therethrough, aligned axially with top plate opening 21a preferably of like diameter. Rotation seals are preferably employed at each of said openings 34a and 21a. Hollow cylindrical conduit or sleeve 41 rotatably extends through openings 21a and 34a and has lower plate 42 fixed to the lower end thereof and switch control arm plate 43 bolted atop same. Sleeve 41 is not liquid tight or sealed. Lower flange 42 extends substantially diametrically across the lower end of conduit 41 at the top of the lower zone of tank 19 and further has two vertically side frame extensions 44 fixed to the outer ends thereof, the latter preferably extending downwardly to closely above the tank bottom wall 19a. Cross beam or follower 45 extends between and connects at its ends to vertical side members 44, thus making a rigid rectangular frame of members 42, 44 and 45 thereof. A further terminal cross connecting element 46 extends between and connects the lower ends of elements 44 thereby to complete a frame rigid though light, the frame or grid having as interconnected elements thereof lower flange 42, vertical elements 44, follower 45 and terminal member 46. All of this is rigidly attached to the lower end of conduit 41, while not frictionally contacting the tank thus rotatable with conduit 41.

Figure 3:
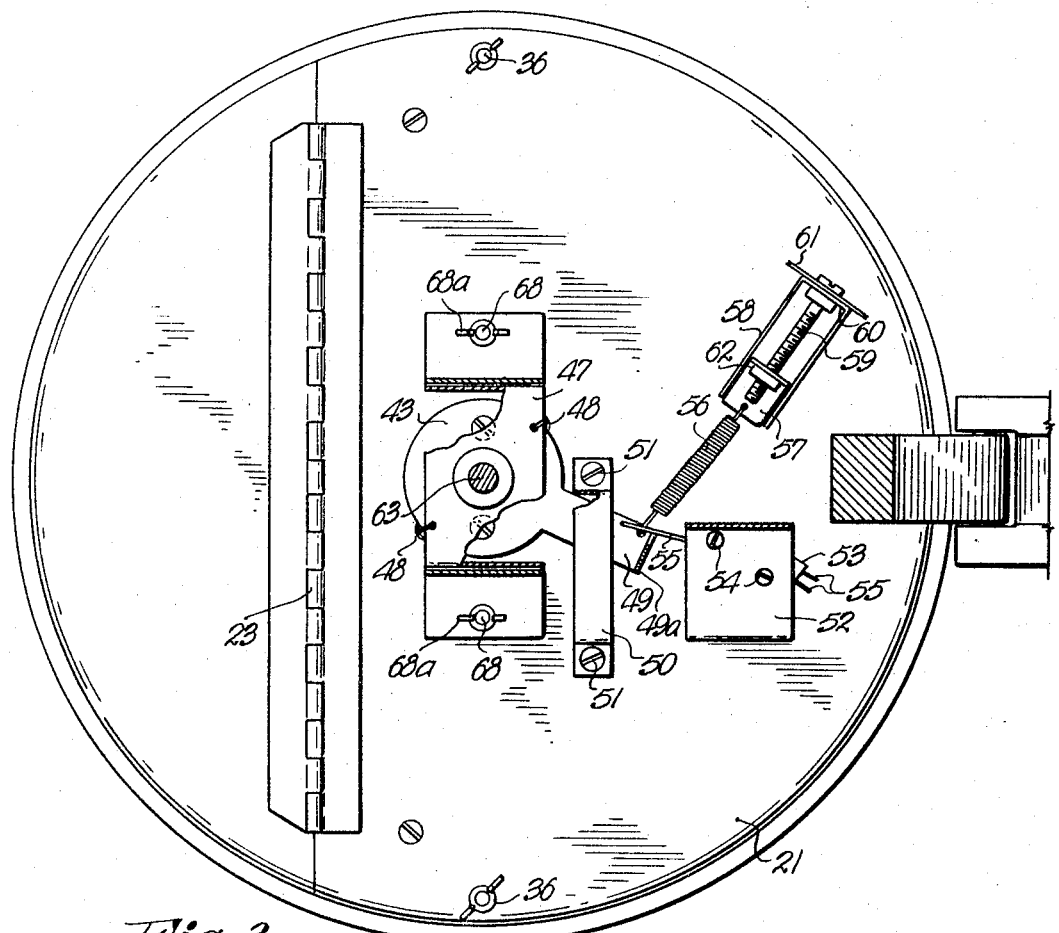
FIGURE 3 is a view taken along the line 3—3 of FIGURE 1 in the direction of the arrows.
Figure 4:
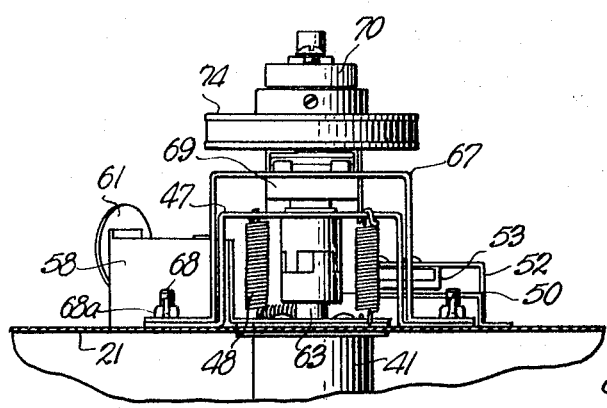
FIGURE 4 is a view taken along the line 4—4 of FIGURE 1 in the direction of the arrows.

Referring to the structures above cover 21 and especially FIGURES 3 and 4, first bracket 47 is mounted overlying opening 21a in top plate 21 as is best seen in FIGURES 3 and 4. Said first bracket 47 immediately overlies, and includes between the cover attachments thereof, control arm plate 43 which is rigidly connected to and rotatable with sleeve 41. A pair of vertical coil springs 48 connect at one end thereof to the central upper level portion of bracket 47 and at the other ends thereof to circular plate 43. Springs 48 thus suspend control arm plate 43, sleeve 41 and all the lower frame rigidly attached to the latter control arm (including lower flange 42, outer members 44, follower 45 and terminal member 46).

Plate 43 has radial switch contacting arm extension 49 thereon. Stop bracket 50 is fastened to top plate 21 by screws 51 and overlies and includes arm 49. Stop bracket 50 permits rotational motion to a limited degree only of arm 49, plate 43 attached thereto and conduit 41, bracket 47 serving as a stop in the other direction. Switch mounting bracket 52 mounts ON-OFF switch 53 for start-stop operation of the power source which circulates heat exchange medium through pipes 33 at freezing chamber 26. Switch 53 is fastened thereto by screws 54 and has electrical connection 55 thereto. Switch 53 operates the compressor (and optional pump) in the coil 33 cooling circuit as noted before. Switch actuating arm 55 extends outwardly from switch 53.

Tension adjusting means are provided to normally tend to maintain control arm 49, control arm plate 43, conduit 41, the attached frame, etc., rotationally at the extreme position of bracket 50 seen in FIGURE 3. Such will also hold switch arm 55 in clockwise bias in the view of FIGURE 3 or "ON." Such tension means include spring 56 attached at one end to arm 49 and at its other end to a slide 57. Slide 57 is movably received in slideway 58 and is adjustable therein via bolt 59 and nut 62. The former is received at its head end through slideway terminal wall 60. Turning disc 61 is fastened to the shaft of bolt 59 and may be turned in either clockwise or counterclockwise direction whereby to tighten or loosen nut 62 on threaded shaft 59 thereby to advance or retract slide 57 in slideway 58 and thus tensioning to a greater or lesser degree spring 56. Thus the action of spring 56 is to rotate plate 43 and conduit 41 counterclockwise in FIGURE 3 within the resilient mounting and centering action of springs 48. Simultaneously, this motion is normally resisted by the resilient bias of switch arm 55 (down in the view of FIGURE 3 toward normal "OFF" position). The excess of force over spring 56 required to spring or permit switch arm 55 to move clockwise in the view or to "OFF" is critical and relates to the heart of the invention. Switch 55 must go to "OFF" before control arm 49 again hits stop 50, in clockwise rotation of arm 49, while switch 55 must go to "ON" continuously with spring 56 in the absence of a fixed additive quantity of rotative force applied from conduit 41 and plate 43 from follower 45.

Looking down on the switch means in FIGURE 3, it is assumed that, with arm 49 as far in counterclockwise rotation as is permitted by stop bracket 50, thus pushing switch arm 55 counterclockwise, switch 53 is "ON" whereby to permit power to pass to the compressor which circulates cooling medium into coil 33 of freezing chilling chamber 26. Under circumstances of operation to be described, if arm 49 moves (rotates) in a clockwise direction against the tension of spring 56 because of torque from follower 45, switch 55 will move clockwise in the view and, before arm 49 abuts bracket 50, shut off power to the compressor previously described.

Figure 2:
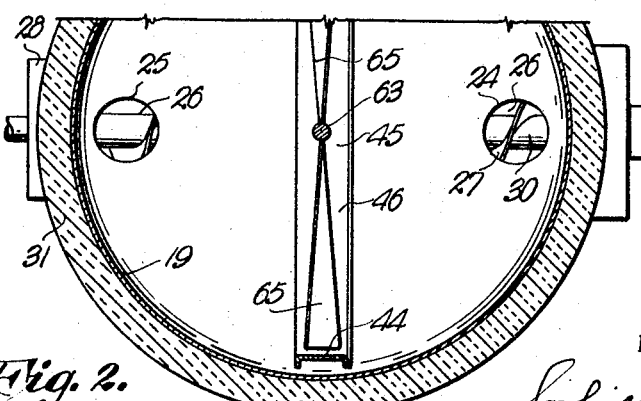
FIGURE 2 is a view taken along the line 2—2 of FIGURE 1 in the direction of the arrows.

The agitating means for the lower portion of tank 19 below divider plate 34 will now be described. Elongate shaft 63 rotatably extends through aligned, like diameter openings in top plate 43, the sealed top of conduit 41, lower flange 42 and terminal frame member 46. A pair of paddle or blade sets 64 (upper) preferably radially offset with respect to one another and 65 (lower) are fixed to shaft 63 below divider plate 34 and rotate therewith. Blades 64 and 65 are spaced vertically and include therebetween follower 45. The length of blades 64 and 65 is sufficiently smaller than the inside diameter of tank 19 that said blades also rotate within vertical side members 44 of the lower zone frame. Blades 64 and 65 are preferably quite closely positioned above and below follower 45. They rotate clockwise in FIGURE 2 drawing down the liquid and effecting turbulent conditions in the liquid. Typical r.p.m. is 60 with a six-inch blade radius. A suitable rotation washer or like member 66 is fixed to the lower end of shaft 63 on the lower side of transverse frame member 46. Thus, shaft 63 and blade sets 64 and 65 rotate within the frame and conduit 41, etc., which do not rotate therewith in full rotation, but tend to follow in the direction of rotation and fluid circulation due to force exerted largely on follower 45. The quantity of force exerted on follower 45 in rotation thereof is a function of (1) velocity of rotation of the agitators, (2) quantity of fluid agitated (blade size and shape) and (3) the viscosity of liquid in the tank lower zone. With (1) and (2) constant with a constant velocity motor on shaft 63, (3) becomes the determinant re the quantity of follower 45 and its frame.

Referring to the power connections for driving shaft 63 and blade sets 64 and 65, a second bracket 67 is positioned over lower bracket 47 carrying springs 48 connected to plate 43. Brackets 47 and 67 are both rigidly yet removably connected to top plate 21 by studs 68 and wing nuts 68a. Bearings for shaft 63 are received between split arms 69 and 70, the latter connected to main arm 71 pivoted to rigidly fixed block 72 by shaft 73. Pulley 74 receives belt 75 which is trained over sheaves 76 whereby to engage second pulley 77 mounted on shaft 78, the latter received on plate 79.

Agitator power source 80, such as an electric motor, is mounted on suitable plates 81 and 82 fixed in and re housing 10 drives shaft 83 having pulley 84 thereon. Belt 85 from pulley 84 drives larger pulley 86 on one end of shaft 30 connected to screw pump 27. Lesser pulley 87 through belt 88 drives pulley 89 also mounted on shaft 78 with pulley 77. Thus, it is seen that power source 80, when ON, continuously drives at a fixed rate both screw pump 27 and agitating blades 64 and 65 by virtue of the pulley and belt connections described. The agitator power source 80, which also simultaneously drives screw pump 27 operates continuously from a simple ON-OFF switch (not seen) in a separate circuit from switch 53 and the compressor circuit. Motor 80, when switched on into connection with a source of electrical power, runs continuously until switched off independent of switch 53 action.

In operation of the subject device, and in practice of the instant process, a sufficient quantity of flavored or sugar water is poured into tank 19 through hinged closure 22 to fill the entire system, including chilling channel 26, passages 24 and 25. Thus, the operation of the system is commenced with the system preferably at least substantially liquid full.

Once the device is filled with the desired flavored or sugar water mixture (1) rotation of shaft 30 with screw pump 27 thereon is commenced (motor 80), (2) rotation of shaft 63 with agitator blades thereon also (motor 80) and (3) circulation of heat exchanging medium through the coils 33 whereby to begin to lower the temperature of fluid in chilling chamber or channel 26. Thus, power to the conventional compressor and pump for deviation of coils 33 is initiated. These latter are not shown as conventional, but switch 53 with arm 55, as in FIGURE 3 loaded by spring 56 effects this.

The reactive force exerted by follower (or paired follower) vanes 45 affixed to the floating frame is, as noted, a function of mixture consistency or viscosity and adjusting spring 56. Control arm 49 reacts on arm 55 of microswitch 53 [optionally through a suitable time delay relay (not seen)] thereby to cause the condensing unit or like heat exchange means to supply refrigerant to coils 33 as required to maintain the desired preset consistency of product. Constant fluid circulation by means of the pumping screw 27 is set up, the mixture passing down through passage 24, horizontally through chilling channel 26 and up through recycle passage 25. The liquid in tank 19 below divider plate 34 is thereby continuously agitated by blades 64 and 65. As the temperature of the total liquid content of the lower zone of tank 19 drops due to repeated circulation through chilling chamber 26, approaching the desired or preadjusted or calculated equilibrium state wherein a certain percentage content of frozen particles is being both agitated and circulated simultaneously in a liquid body of rising viscosity. It will be noted that the permitted or accepted lower zone liquid consistency or viscosity of a desired or set equilibrium state is continuously maintained by the relative load of adjusting spring 56 on arm 49 which establishes the required excess of force to be exerted by followers 45 through floating frame 26 to shift switch 53 via arm 55 to "OFF." Thus, as the flavored or sugar mixture progressively cools and becomes more viscous and as the percentage of frozen particles becomes greater, contributing to the same effect, thus tending to approach the solid state, the rotative applied or torque forces continuously exerted by the constant speed rotation of blades 64 and 65 rise and finally overcome the various counterforces imposed on control arm 49 by spring 56 and springs 48, microswitch 53 goes to "OFF" thereby stopping the pump and condensing unit on the circuit, including circulation through coils 33.

Then, without cooling in freezing chambers 26 via coils 33 because switch 53 is OFF so long as the follower forces override springs 56 and 48, the temperature in the lower zone of tank 19 rises. The mixture therein becomes less viscous and the percentage of frozen particles becomes less. Also, if product is dispensed, lower zone temperature rises due to the addition of fresh mixture from the upper zone of tank 19. Control arm 49 is then able to be again influenced by reactive force imposed by spring 56 and microswitch arm 55 goes up (clockwise) in FIGURE 3 to "ON," thereby starting the pump and condensing unit in the coil 33 circuit. Both the freezing chamber, pumping and lower zone agitating action take place continuously at all times at a fixed rate, whether or not the coil circuit condensing unit and pump are ON or OFF. Additionally, this circulation takes place continuously at fixed rate whether or not dispensing valve or nozzle 69 is in actuation.

The operator may dispense the product merely by opening valve 39 by means of handle 40. As the screw pump turns continuously, it acts as a pump to force the product out rapidly so that there is not simple gravity flow. Turbulence created in the paper cup or container receiving the product insures complete mixing of any flavor concentrate placed in the cup prior to dispensing the slush-type sugar water mixture into same.

In a typical formulation utilizing four and one-half gallons of water and five pounds of sugar, freezing will start at about 30.5° F. and the mixture will freeze solid around 26° F. This then is a typical temperature range in which the device operates.

Thus it may be seen that the instant device is a self-regulating, continuously operating and controlled mechanism operative and effective to maximally accomplish all of the originally listed objects and advantages.

It is most desirable that all mechanism and parts of the above-described device be made of stainless steel and that the machine be used preferably and solely for sweet water and flavored drinks. Scrubbing and washing is kept to a minimum in view of the fact that all liquid may be gravity drained from the entire assembly from the spigot. However, the machine is so designed as to be readily and easily disassembled, when desired, for complete washing and scrubbing. In order to clean the device out, no more product is supplied to tank 19 and the system is drained by opening dispenser valve 39. Flushing water may then be circulated through the system via agitators and pump if desired, and discharged through valve 39. The natural gravity flow in the system is aided by pumping action of screw pump 27.

It should be understood that any preferred conventional refrigerating means jacketing freezing chamber 26 may be employed, with any suitable conventional source or device effecting cooling. Thus, a closed cycle brine heat exchange system without requirement of a compressor, utilizing only a pump in a recirculating flow circuit connected with coils 33 would be sufficient. In such case, the action of switch 53 would merely be to turn off and on the said pump, causing starting and stopping of circulation of the refrigerant fluid or heat exchanging medium in coils 33.

The divider plate 34 circumferential clearance from insert tank 19 is closely adjusted and regulated with respect to the volume of the tank zones thereabove and therebelow, that is, for a minimum flow interchange between the upper and lower tank zones. This refers to both upwards and downwards liquid interchange. With respect to the former, minimization of the said peripheral flow space results in essential isolation of the upper tank zone from the lower tank zone with respect to liquid or heat exchange therebetween. Thus, the lower zone contains frozen particles, but not the upper. As a result of this effective tank zone segregation, the capacity of freezing chamber 26 and that of the heat exchanging system 33 associated therewith may be minimized. A further result of this is that, in a single tank structure of great simplicity, relatively precise control of the desired volume and quantity of material in condition ready to be dispensed is achievable, while, furthermore, the desired volume of reserve material available to be put into the freezing zone is also precisely controllable. With respect to the second aspect of flow between the upper and lower tank zones, (from upper to lower) the controlled rate of supply downwardly peripherally of plate 34 results in a minimum dilution and deterioration of the ice crystal condition in the lower portion of the tank and thus a minimum disturbance of product to be dispensed. Further, the peripheral distribution of the resupply is greatly dispersed, not concentrated, into the lower tank, also for minimum distribution of the uniform conditions therewithin. The replacement is in continuous bleed manner as product is withdrawn from the pipe 38.

The above noted considerations permit minimization of the tank volume below the divider plate, enlargement almost as desired of the tank thereabove, minimization of the circulation and agitation loads on the screw pump and agitator blades 65 and, as mentioned, minimization of refrigeration load on the heat exchanging system 33 and thus minimizing of the required size of freezing chamber 26.

From the foregoing it will be seen that this invention is one well adapted to attain all of the ends and objects hereinabove set forth, together with other advantages which are obvious and which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described by invention, I claim:

1. Apparatus for making an ice slush beverage comprising:
    a tank,
    a cover for said tank,
    divider plate means suspended from said cover adapted to separate the space within said tank into an upper and a lower zone,
    rotating agitator means in said lower zone adapted to agitate and circulate liquid therewithin below said divider plate means,
    power driving means for said agitating means,
    means forming a heat exchanging channel positioned below said lower zone,
    a first flow conduit from one side of said lower zone communicating with one end of the heat exchanging channel,
    a second flow conduit from the other side of said lower zone communicating with the other end of the heat exchanging channel,
    heat exchanging means in heat exchanging communication with said heat exchanging channel,
    a screw pump in said heat exchanging channel operative to move liquid therein out of the first and into the second flow conduit,
    drive means for said screw pump,
    and a filler opening for the upper zone in said tank cover,
    the power means for the agitating means including a power source above said cover and a vertical drive shaft driven by said agitating means power means communicating from the lower zone through the divider plate means and tank cover,
    and a vertical sleeve encircling the portion of said drive shaft above said divided plate extending through both said divider plate and tank cover in freely movable fashion.

2. Apparatus for making an ice slush beverage comprising;
    a tank,
    a cover for said tank,
    rotating agitator means in said tank adapted to agitate and circulate liquid therewithin in a circular or rotary manner.
    power driving means for said agitating means,
    means forming a heat exchanging channel position below said tank,
    a first flow conduit from one side of said tank communicating with one end of said heat exchanging channel,
    a second flow conduit from the other side of said tank communicating with the other end of said heat exchanging channel,
    heat exchanging means in heat exchanging communication with said heat exchanging channel, a screw pump in said heat exchanging channel operative to move liquid therein out of the first and into the second flow conduit, drive means for said screw pump, follower means resiliently and rotatably suspended centrally of said tank and adapted to be displaced around a vertical axis of rotation thereof by rotating motion of the fluid being agitated in the tank to a degree and in a manner proportional to the relative viscosity of the liquid being circulated in said tank and the velocity of motion thereof, and means connecting said suspended follower means to an ON-OFF type switch whereby a limited rotational displacement of said resiliently suspended means activates said switch.

3. Apparatus as in claim 2 wherein the follower means comprises a flat radial beam in said tank mounted closely adjacent to said agitator means.

4. Apparatus as in claim 2 including a cover for said tank, the power means for the agitating means including a power source, a vertical drive shaft driven by said last power source communicating through the tank cover, and the means resiliently and rotatably suspending said displaceable follower means in said tank comprising a vertical hollow sleeve enclosing the portion of said drive shaft extending through said cover and some portion of same within said tank, said sleeve rotatably penetrating said tank cover and supported by means carried above and by said tank cover.

5. Apparatus as in claim 2 wherein the agitator means comprises a pair of vertically spaced, radially extending centrally driven paddles and the follower means is spaced vertically between said paddles.

6. Apparatus as in claim 5 wherein said paddles are radially displaced from one another on their drive axes.

7. Apparatus as in claim 4 wherein the agitator means comprises two vertically spaced rotating paddles and the follower is a radial beam therebetween carried by a frame on the sleeve.

8. Apparatus for making flavored water into an ice slush beverage comprising;

an agitating tank, agitator means in said agitating tank, power driving means for said agitating means, a refrigeration channel positioned below said agitating tank, a first flow conduit from a lower portion of the agitating tank to one end of the refrigeration channel, a second flow conduit from the other end of the refrigeration channel returning to a lower portion of the agitating tank, refrigerating means jacketing said channel, a screw pump in said channnel, means to rotate said screw jump in such manner as to move liquid therein from the first flow conduit to the second flow conduit, means for dispensing liquid from said channel, a supply tank positioned above said agitating tank, and intercommunication for replacement liquid flow between said supply tank and agitating tank to replace liquid dispensed from said channel, said flow intercommunication of such character that back flow therethrough is essentially eliminated and replacement supply flow is essentially metered.

9. Apparatus as in claim 8 wherein said agitator means in said agitating tank operates in such manner as to minimize back flow communication between said agitating tank and said supply tank.

10. Apparatus for making an ice slush beverage comprising;

a tank, a cover for said tank, divider plate means suspended from said cover adapted to separate the space within said tank into an upper and a lower zone, rotating agitator means in said lower zone adapted to agitate and circulate liquid therewithin below and divider plate means, power driving means for said agitating means, means forming a heat exchanging channel positioned below said lower zone, a first flow conduit from one side of said lower zone communicating with one end of the heat exchanging channel, a second flow conduit from the other side of said lower zone communicating with the other end of the heat exchanging channel, heat exchanging means in heat exchanging communication with said heat exchanging channel, a screw pump in said heat exchanging channel operative to move liquid therein out of the first and into the second flow conduit, drive means for said screw pump, a filler opening for the upper zone in said tank cover, follower means resiliently suspended substantially centrally of said lower zone and adapted to be yieldably and rotatably displaced in position around the vertical central axis thereof to some degree by virtue of the circulation of the liquid in said zone by said agitating means and to a degree proportioned to the relative viscosity of the liquid being circulated and the velocity of circulation thereof, and means coupling resiliently suspended follower means to an ON-OFF type switch whereby a measured displacement of said suspended follower means actuates said switch.

11. Apparatus as in claim 10 wherein the releasing force of said switch is adjustable.

12. Apparatus as in claim 10 wherein the power means for the agitating means includes a power source and a vertical drive shaft driven by said agitating means, power means communicating from said lower tank zone through the divider plate and tank cover and the means resiliently suspending said follower means in said lower zone comprises a vertical sleeve encircling the portion of said drive shaft in said upper tank zone and rotatably penetrating said divider plate and tank cover, said sleeve resiliently suspended from means positioned above said tank cover.

13. Apparatus as in claim 12 including means on said sleeve above said cover adapted to contact said switch at one rotational position of said sleeve and operate same.

14. Apparatus as in claim 13 wherein said switch is resiliently biased to an ON position.

15. Apparatus as in claim 12 including means for limiting the rotational travel of said follower means around its axes.

16. Apparatus as in claim 10 wherein said follower means includes a transverse radial beam extending across a substantial portion of said tank lower zone in a plane substantially parallel to the plane of rotation of said agitator.

17. Apparatus as in claim 16 wherein said follower means includes a frame portion peripherally including said agitator means.

18. Apparatus for making flavored water into an ice slush beverage comprising;

an agitating tank, agitator means in said agitating tank, power driving means for said agitating means, a supply tank positioned above said agitating tank, metering flow connection between the lower portion of said supply tank and the upper portion of said agitating tank, said supply tank of at least substantially the same volume as said agitating tank, a refrigeration channel positioned below said agitating tank,
said channel of substantially lesser volume than said agitating tank,
a first flow conduit from a lower portion of the agitating tank to one end of the channel,
a second flow conduit from the other end of the channel returning to a lower portion of the agitating tank,
refrigerating means jacketing said channel,
a screw pump in said channel extending substantially the length of same between said two conduits,
means to rotate said screw pump, whereby same is operative to move liquid therethrough from the first conduit connection to the second,
and a dispensing spigot connected to the end of said channel closely adjacent the connection of said second conduit thereto, the connection of said dispensing spigot directly in line with the discharge end of said screw pump in said channel.

19. A process for producing a slush of liquid containing frozen particles comprising
agitating a liquid in an agitating zone;
flowing liquid from said agitating zone into the inlet of a chilling zone;
passing said liquid through said chilling zone by means of a screw pump positioned therein so as to form frozen particles therein;
passing the liquid containing frozen particles from the outlet of the chilling zone into the agitating zone;
continuously circulating liquid and frozen particles through the agitating zone and the chilling zone until the entire body of circulating liquid is converted into a slush of liquid containing frozen particles; and removing a slush of frozen particles in liquid from the outlet of said chilling zone as the product of the process.

20. Apparatus for making a slush of liquid containing frozen particles comprising:
an agitating tank;
agitator means in said agitating tank;
power driving means for said agitating means;
means to supply liquid to said agitating tank;
a cylindrical chilling chamber;
a first flow conduit connecting a first lower portion of said agitating tank to a first end of said chilling chamber;
a second flow conduit connecting a second lower portion of said agitating tank to a second end of said chilling chamber;
refrigerating means jacketing said chilling chamber;
a screw pump in said chilling chamber extending substantially the length of same between said two conduits;
means to rotate said screw pump, whereby same is operative to move liquid and frozen particles therethrough from the first conduit connection to the second; and
a discharge outlet for the slush separate from said flow conduits connected to said chilling chamber at the discharge end of said screw pump.

References Cited by the Examiner
UNITED STATES PATENTS

| | | | |
|---|---|---|---|
| 2,259,841 | 10/1941 | Spiegel | 62—68 X |
| 2,745,641 | 5/1956 | Jacobs | 222—236 |
| 2,902,839 | 9/1959 | Marshall | 62—354 |
| 3,045,441 | 7/1962 | Patch et al. | 62—68 |
| 3,101,598 | 8/1963 | Ross | 62—71 |

ROBERT A. O'LEARY, *Primary Examiner.*

W. E. WAYNER, *Assistant Examiner.*

UNITED STATES PATENT OFFICE
CERTIFICATE OF CORRECTION

Patent No. 3,319,436                          May 16, 1967

Clarence N. Wilch

It is hereby certified that error appears in the above numbered patent requiring correction and that the said Letters Patent should read as corrected below.

Column 9, line 56, for "jump" read -- pump --; column 10, line 5, for "and", second occurrence, read -- said --; line 31, after "coupling" insert -- said --.

Signed and sealed this 26th day of December 1967.

(SEAL)
Attest:

Edward M. Fletcher, Jr.                        EDWARD J. BRENNER
Attesting Officer                              Commissioner of Patents